United States Patent

Hofbauer et al.

[11] 4,183,332
[45] Jan. 15, 1980

[54] INTAKE SYSTEM

[75] Inventors: Peter Hofbauer; Wilhelm Heimermann; Dieter Gümmer; Michael Willmann, all of Wolfsburg, Fed. Rep. of Germany

[73] Assignee: Volkswagenwerk Aktiengesellschaft, Wolfsburg, Fed. Rep. of Germany

[21] Appl. No.: 871,089

[22] Filed: Jan. 19, 1978

[30] Foreign Application Priority Data

Jan. 20, 1977 [DE] Fed. Rep. of Germany ....... 2702160

[51] Int. Cl.$^2$ .............................................. F02B 75/18
[52] U.S. Cl. ................... 123/52 M; 123/59 R; 123/119 B; 123/141
[58] Field of Search ............ 123/52 R, 52 M, 52 MV, 123/52 MB, 52 MC, 59 R, 59 A, 141, 119 B

[56] References Cited

U.S. PATENT DOCUMENTS

| 1,771,886 | 7/1930 | Fekete et al. | 123/52 MC |
| 3,561,408 | 2/1971 | Weiand | 123/52 MV |
| 3,811,416 | 5/1974 | Gospodar et al. | 123/52 M |
| 3,908,617 | 9/1975 | Partridge | 123/119 B |
| 3,983,853 | 10/1976 | Gospodar et al. | 123/52 M |
| 4,013,049 | 3/1977 | Dilgard et al. | 123/52 M |
| 4,109,620 | 8/1978 | Webb | 123/52 M |
| 4,111,163 | 9/1978 | Ederer et al. | 123/52 M |

FOREIGN PATENT DOCUMENTS

| 2436556 | 5/1975 | Fed. Rep. of Germany | 123/141 |
| 2644444 | 4/1977 | Fed. Rep. of Germany | 123/141 |
| 1012425 | 12/1965 | United Kingdom | 123/52 M |

Primary Examiner—Charles J. Myhre
Assistant Examiner—Craig R. Feinberg
Attorney, Agent, or Firm—Brumbaugh, Graves, Donohue & Raymond

[57] ABSTRACT

An intake system for a multi-cylinder, internal combustion engine, such as a compression ignition (Diesel) engine. The system includes an air filter housing opening directly into a number of intake pipes (one per cylinder) each leading separately to an individual cylinder. The filtered air side of the filter housing thus serves simultaneously as an intake manifold and as an intake silencer.

12 Claims, 4 Drawing Figures

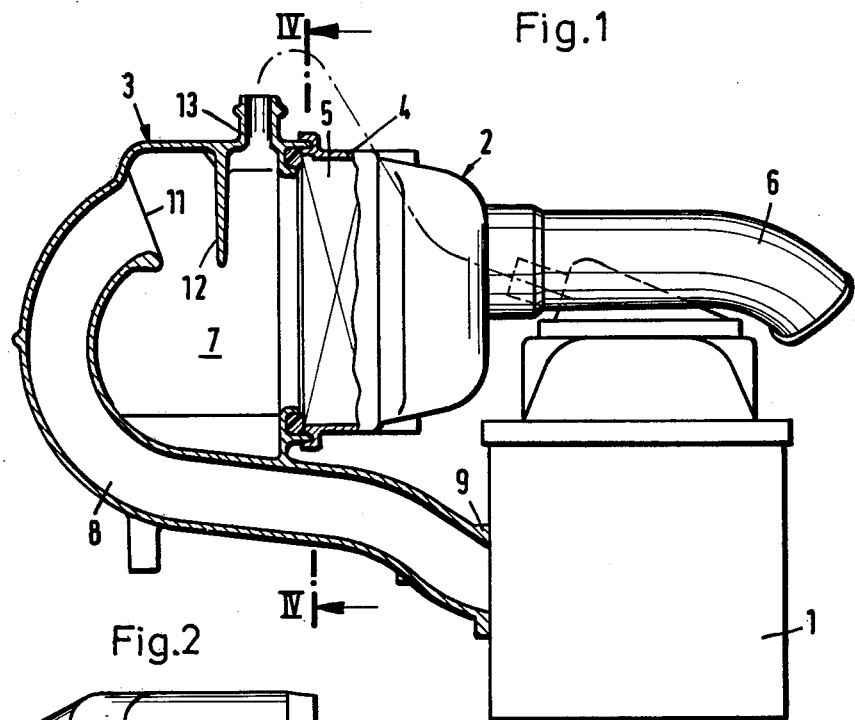
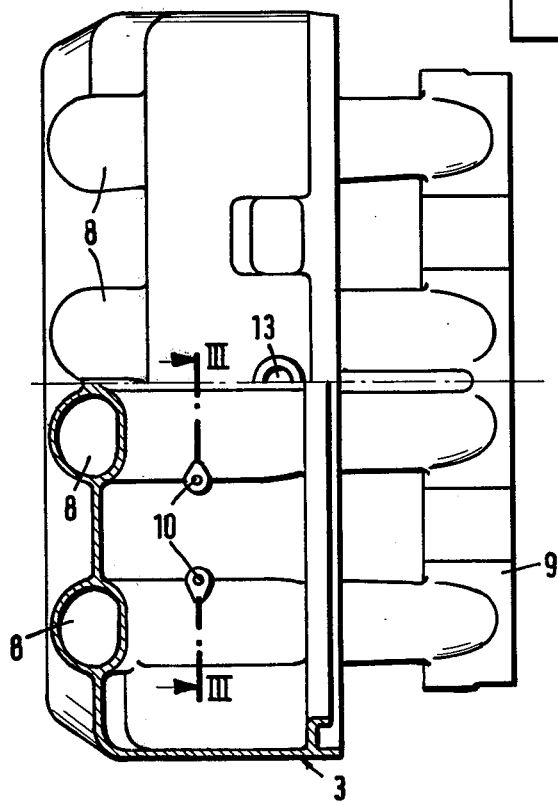

INTAKE SYSTEM

BACKGROUND OF THE INVENTION

The present invention relates to an intake system for a multi-cylinder internal combustion engine, in particular a compression ignition, fuel-injected internal combustion engine, having an air filter arranged in a housing and having intake pipes leading separately to the individual cylinders.

In a conventional internal combustion engine, such as a Diesel engine in particular, intake air is drawn through a filter arranged in an air filter housing and passes into an intake manifold designed as intake silencer, from which branch off the intake pipes leading to the individual engine cylinders. It is a purpose of the present invention to improve upon an intake system of this type and, in particular, to achieve optimal utilization of the limited space available in an engine compartment by means of a compact design, while maintaining favorable intake conditions.

SUMMARY OF THE INVENTION

The above-mentioned purpose is achieved, in accordance with the present invention, by constructing the intake pipes to open directly into the air filter housing, which is designed to form an intake silencer chamber on the filtered air side. With this arrangement, the filtered air side of the air filter housing can serve at the same time as an intake silencer and an intake manifold. In this case, it is advantageous to construct the portion of the air filter housing on the filtered air side as a cast iron housing component enclosing the intake silencer chamber so as to increase the rigidity of the housing. Such rigidity is necessary in order to withstand the vibrations resulting from the pressure fluctuations produced in the intake pipes as well as the vibrations (i.e., the sound vibrations conducted through solids) transmitted directly from the engine.

According to a further feature of the invention, the intake pipes are arranged side-by-side and are integrated with the cast-iron housing portion on the filtered air side of the filter housing. Due to the fact that the intake pipes form at least a part of one or more walls of the housing, the intake system is especially compact and rigid in construction. In addition, the portions of the intake pipes which are integral with the walls of the filter housing may be curved in their longitudinal dimension to accommodate the longest possible pipe lengths in a comparatively small space. In order to facilitate air flow with the lowest possible resistance, the radii of curvature of the pipes should be made relatively large. By means of such long intake pipes, which thus act as "tuned" pipes, the air supply to the internal combustion engine cylinders can be substantially improved, especially in the medium and lower engine speed ranges.

In accordance with a still further advantageous feature of the invention, the cross sectional shape of the intake pipes is flattened in the zone of the inner radius of curvature. This shaping of the curved intake pipes permits better utilization of the flow cross section and better utilization of the overall available space. It is generally known that when curved pipes are used, the cross sectional region near the inner radius of curvature is not well utilized anyway due to the flow separations occurring there, so that this region may be eliminated to increase the capacity (volume) of the air filter housing forming the intake silencer chamber or space.

In order to prevent the direct transmission of intake pulsations by the intake pipes to the air filter cartridge in the filter housing which would result in considerable noise and would impair the filtering action by the filter cartridge because of the induced vibrations, the cast iron housing is provided with a transverse rib extending essentially perpendicular to the intake pipe axes in the region preceding the openings of the intake pipes. Moreover, the filter housing may be provided with a connection for a crankcase vent line ahead of the transverse rib, as viewed in the direction of air flow. The arrangement of the crankcase vent line directly preceding the transverse rib, with the rib designed in a special manner, results in a uniform and thorough distribution of the gases (e.g., oil and fuel vapors) recycled from the crankcase of the internal combustion engine through the vent line into the filter housing, so that all cylinders are supplied with approximate uniformity. It has been found that if the crankcase oil vapors are supplied non-uniformly to the individual cylinders, cylinders which receive more than their share develop residues which cannot be removed or can be removed only with difficulty, whereas the cylinders which are supplied with less than their share or with no oil vapors at all suffer from increased wear of the valve seat rings. In order to obtain uniform distribution of the oil vapors, the transverse rib is designed to extend to different levels in front of the intake pipes leading to the individual cylinders; in particular, in the region of the intake pipes that are closest to the crankcase vent connection, the transverse rib is to be wider than in the region of the more distant intake pipes.

Finally, the bottom area of the cast iron housing is provided with oil holes or bores which connect the intake silencer space with the intake pipes. In this manner, the oil condensing on the walls of the air filter housing, which is carried by the oil vapors recycled from the engine crankcase, is distributed uniformly to all cylinders. Therefore, it cannot happen that the oil vapors returned from the crankcase space and the oil contained in such vapors are delivered predominantly to one or more cylinders causing excessive residue formation therein.

For a better understanding of the invention, together with other and further objects, reference is made to the following description, taken in conjunction with the accompanying drawings, and its scope will be pointed out in the appended claims.

BRIEF DESCRIPTION OF THE DRAWINGS

FIG. 1 is a cross sectional view through the side of an intake system of a four-cylinder Diesel internal combustion engine, in accordance with the present invention, having an air filter housing and intake pipes connecting the housing to the individual cylinders.

FIG. 2 is a plan view of the bottom portion of the air filter housing shown in FIG. 1, with the intake pipes incorporated therein.

DESCRIPTION OF THE PREFERRED EMBODIMENT

Figure 3:
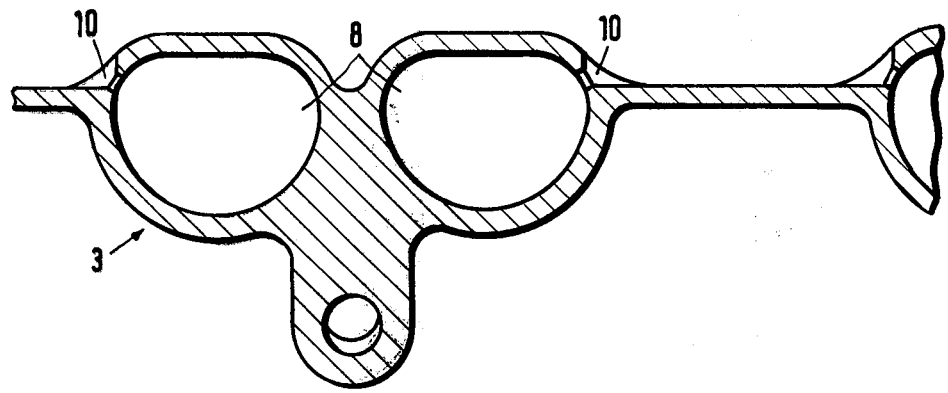
FIG. 3 is a cross sectional view through the air filter housing taken along the sectional lines III—III in FIG. 2.

In FIG. 1, the reference numeral 1 designates the cylinder head of a four-cylinder Diesel internal combustion engine for an automobile, which cylinder head is supplied with combustion air through an intake system designated generally by the reference numeral 2. The intake system 2 consists of a one-piece cas iron element 3 that is designed as the bottom part of an air filter housing; an air filter cover 4 containing an air filter cartridge 5; and a fresh-air intake pipe 6 serving to draw in fresh air from the surroundings.

The cast-iron element 3, which forms the filtered air-side portion of the air filter housing, encloses a relatively large interior space 7 that serves both as an intake silencer space and an intake manifold or distributor. The cast iron housing element 3 is also provided with cast-on (integrally formed) intake pipes 8 which have inlet ends opening directly into the interior 7 and which, because they are curved in their longitudinal direction, form in part the walls of the intake silencer space. The intake pipes 8 separately lead to the individual cylinders of the internal combustion engine where their outlet ends are connected to the engine cylinder head 1 by a flange 9. As is especially clear in FIGS. 2 and 3, the cross sectional shapes of the intake pipes are flattened in their longitudinally curved region at the inner radius of longitudinal curvature.

A transverse rib 12 extending inwardly essentially perpendicular to the intake pipe axes at the pipe inlets or openings 11 is provided in the intake silencer space 7 at some distance ahead of the openings 11 as viewed in the direction of air flow. This transverse rib prevents the intake pulsations generated in the intake pipes 8 from acting directly on the filter cartridge 5. Directly preceding the transverse rib 12 in the direction of the air flow in an inlet pipe 13 providing a connection for a crankcase vent line (not shown) which delivers, directly to the filtered air-side of the filter housing, the gases consisting essentially of oil and fuel vapors as well as combustion residues, etc. that collect in the crankcase space of the engine.

As may be seen in FIG. 3 in particular, oil return holes 10 are provided in the bottom region of the intake silencer chamber which permit the oil carried along by the crankcase vapors and precipitating in the intake silencer space 7 to pass into the intake pipes 8 leading to the individual cylinders of the internal combustion engine.

Figure 4:
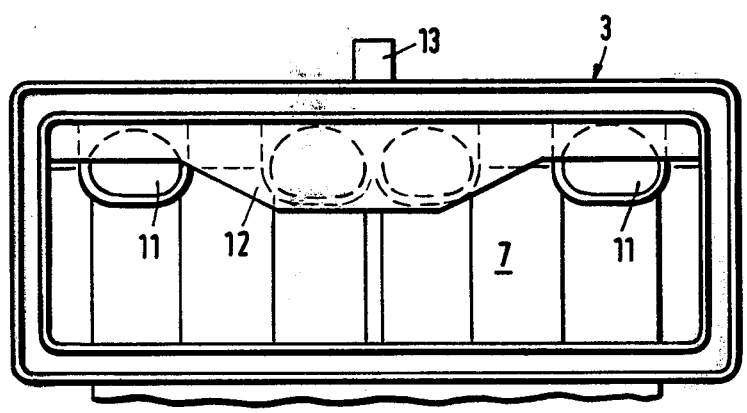
FIG. 4 is an elevational view of the bottom part of the air filter housing seen from the cover side.

FIG. 4, finally, shows the sealing flange of the cast iron housing 3 with the cartridge 5 and the filter cover 4 removed. This view indicates the shape of the transverse rib 12 which extends further inward into the path of air flow in the zone of the inner intake pipe openings 11 than in the zone of the outer intake pipe openings. In fact, the transverse rib in the middle zone extends downwardly so far as to cover completely the openings of the center intake pipes. It has been found that such a design of the transverse rib provides for a quite uniform distribution over the individual cylinders of the vapors from the crankcase space introduced into the intake silencer chamber through the inlet connection 13.

As may be understood from the description above, in accordance with the invention the intake system offers favorable intake conditions, occupies relatively little space, requires few parts, and is of extremely rugged design. The compact construction is achieved from the fact that the filtered air-side of the air filter housing is designed at the same time as an intake manifold and an intake silencer space so that the intake pipes open directly into the air filter housing. Through the curved shape of the intake pipes and their integration with the walls of the air filter housing, it is possible to make the pipes relatively long so that, being tuned they can produce intake conditions favorable to filling the cylinder spaces, in particular in the medium and low speed ranges. Moreover, their integration with the walls result in extra reinforcement of the air filter housing so that, in spite of relatively small wall thicknesses, very high rigidity is achieved. The transverse rib arranged in front of the openings of the intake pipes in the cast iron element (in the direction of flow) prevents the intake pulsations from acting directly on the filter cartridge and affecting it unfavorably. At the same time, the transverse rib is designed in such a manner that the oil vapors delivered through the crankcase vent pipe opening in front of the transverse rib (in the direction of the flow) are uniformly distributed among the intake pipes leading to the individual cylinders. The liquid oil and fuel components brought in with the vapors from the crankcase space and precipitating on the walls of the air filter housing are delivered, also uniformly, to the individual intake pipes through the oil return holes arranged in the bottom of the air filter housing.

Thus, the design proposed in accordance with the invention constitutes an intake system for a compression ignition (Diesel) engine offering an improved distribution of the intake air over the individual cylinders of the engine and a better dampening of the intake opening noise while at the same time decreasing the overall space required for the intake system. The intake pipes may each be designed with an optimal length and thus facilitates an increase in engine torque, in particular in the medium and lower speed ranges. Finally, venting of the crankcase space of the internal combustion engine can be easily integrated with the intake system without any unfavorable effect on the combustion process in the individual cylinders.

While there has been described what is believed to be the preferred embodiment of the invention, those skilled in the art recognize that various changes and modifications may be made thereto without departing from the spirit of the invention, and it is intended to claim all such embodiments as fall within the true scope of the invention.

We claim:

1. An intake system for a multicylinder internal combustion engine, in particular a compression ignition (Diesel) engine, said system comprising:
   (a) an air filter housing adapted for holding an air filter cartridge such that air flows through the filter cartridge in the longitudinal direction, said air filter housing including:
      (1) an air filter cover adapted to accommodate the filter cartridge and having a fresh air inlet pipe; and
      (2) a one-piece, bottom part forming the filtered air side of the housing and enclosing an interior space which, as viewed in the direction of longitudinal air flow, directly follows said filter cartridge and serves both as an intake silencer and an intake manifold; and
   (b) a plurality of intake pipes arranged side by side, each having an outlet end leaping separately to an individual cylinder of the engine and an inlet end opening directly into said interior space of said housing, said intake pipes extending around and within said bottom part space, and each of said pipes having a first, inner wall forming a portion of the inner wall of said space, and separating said pipe from said space and a second, outer wall, separating said pipe from the surrounding atmosphere.

2. the intake system defined in claim 1, wherein said metal is iron.

3. The intake system defined in claim 1, wherein said intake pipes are arranged side-by-side and are integrally formed of the same piece as said cast metal element of said housing.

4. The intake system defined in claim 3, wherein said intake pipes are curved in their longitudinal direction, at least in the region of their inlet ends where they integrate with the walls of said housing.

5. The intake system defined in claim 4, wherein the cross-section of each intake pipe in the curved region thereof is rounded in the zone of the outer radius of curvature and flattened in the zone of the inner radius of curvature.

6. The intake system defined in claim 1, wherein said cast iron element includes a transverse rib extending inwardly into the filtered air path ahead of the inlet ends of said intake pipes, substantially perpendicular to the pipe axes at said inlet ends.

7. The intake system defined in claim 6, wherein said housing includes an inlet connection for a crankcase venting line preceding said transverse rib in the direction of air flow.

8. The intake system defined in claim 7, wherein said transverse rib extends further into the air path in the region of the intake pipes which are close to the crankcase vent connection than it does in the region of the more distant intake pipes.

9. The intake system defined in claim 1, wherein at least one oil return hole is arranged in said housing at the bottom of said silencer space.

10. The intake system defined in claim 9, wherein each oil return hole opens into a separate intake pipe.

11. The intake system defined in claim 10, wherein there is one oil return hole for each intake pipe.

12. The intake system defined in claim 11, wherein said filtered air side of said housing is formed of a cast metal element enclosing said silencer space and wherein said intake pipes are arranged side-by-side and are integrally formed of the same piece as said cast metal element of said housing.

* * * * *